June 24, 1941.  L. ALDRIDGE  2,246,492
HUB FOR BICYCLE AND OTHER WHEELS
Filed Aug. 19, 1940
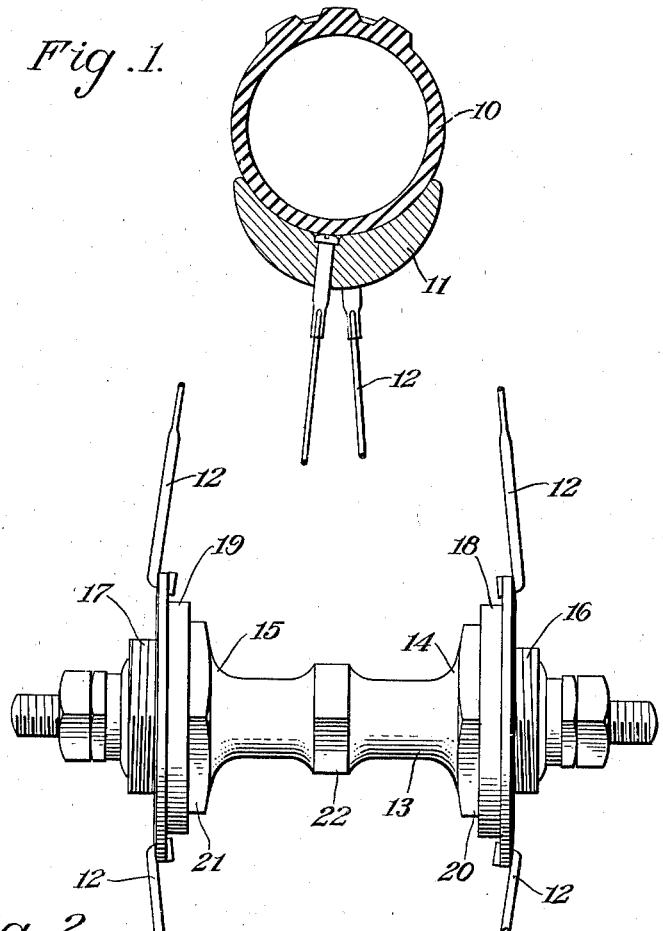
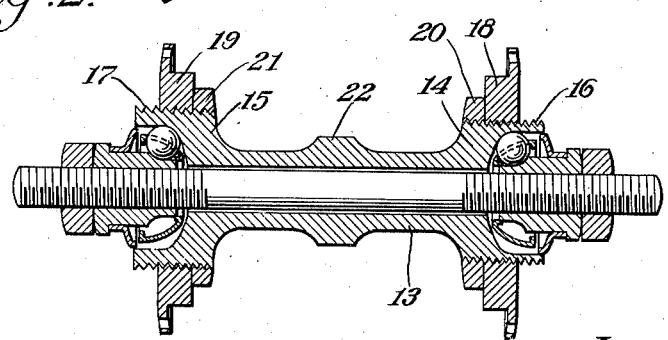
Inventor:
Lee Aldridge, deceased,
By Cora Aldridge, Executrix
BY Victor J. Evans & Co.
ATTORNEYS Patented June 24, 1941

2,246,492

UNITED STATES PATENT OFFICE 2,246,492

HUB FOR BICYCLE AND OTHER WHEELS

Lee Aldridge, deceased, late of Tulsa, Okla., by Cora Aldridge, executrix, Tulsa, Okla., assignor to Cora Aldridge, Tulsa, Okla., legatee Application August 19, 1940, Serial No. 353,313

1 Claim. (Cl. 301—105)

This invention relates to a hub for bicycle and other wheels.

An object of the invention is to provide a wheel hub that can be repaired without disturbing, cutting and destroying the spokes of the wheels.

Bicycle shops are constantly repairing hubs on bicycle wheels to replace barrels and bearings that are worn out, usually for lack of lubrication. The repairs are expensive and wasteful at the present time because it is necessary to cut the spokes and discard them and to dismantle and disassemble the hub in order to insert a new barrel in the hub.

With the above in mind the present invention provides a hub which may be repaired without tearing down the hub and destroying the spokes and to accomplish this purpose a hub is provided having one threaded end of the barrel slightly smaller in diameter than the other threaded end of the barrel so that the barrel may be removed from the hub by removing the hub endwise by unscrewing the barrel at the larger end through the spoke flange at this end and then passing the barrel endwise through the large opening in the spoke flange, the smaller end of the barrel passing through the larger opening without obstruction. A replacement barrel may now be inserted, the smaller end first through the same openings.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a fragmentary cross sectional view of a bicycle wheel having a hub constructed in accordance with the invention, the hub being shown in elevation.

Figure 2 is a longitudinal sectional view of the hub having a small threaded end at the right end and a larger threaded end at the left end of the figure.

Referring now to the drawing in which like characters of reference designate similar parts in the various views, 10 designates the tire, 11 the wheel rim and 12 the spokes of a conventional bicycle wheel.

The hub comprising the subject matter of this invention includes a barrel 13 having both ends 14 and 15 of greater diameter than the barrel. In the present embodiment of the invention both enlarged ends are provided with respective screw threads 16 and 17, one being right-handed and the other being left-handed to receive correspondingly threaded spoke flanges 18 and 19 and correspondingly threaded lock nuts 20 and 21 associated with respective spoke flanges.

The important feature of the invention is that one threaded end of the hub is of less diameter than the other threaded end. In this instance, the threaded end 14 at the right of Figure 2 is of smaller diameter than the threaded end 15 at the left of the figure. The hub is provided centrally with an integral hexagon nut 22 which is smaller in diameter than the larger threaded end 15 of the barrel and consequently the barrel can be passed endwise in the direction of the arrowhead shown in Figure 2 when the lock nuts 20 and 21 are loosened by unscrewing the barrel through the spoke flange 19 having the threaded opening of greater diameter than the threaded end 14 of the barrel. A replacement barrel may be applied without disturbing the spokes by reversing the operation just described.

From the above description it is thought that the construction and operation of the invention will be fully understood without further explanation.

What is claimed is:

A hub comprising, a barrel having enlarged ends of greater diameter than the barrel, one of said ends being of less diameter than the other and both of said ends being externally screw threaded, one screw thread being right-handed and the other being left-handed, spoke flanges on the enlarged ends of the barrel having respective right- and left-handed screw threads engaging the threads of respective enlarged ends of the barrel, lock nuts on the enlarged ends of the barrel bearing against the inner sides of the spoke flanges, and an integral nut on the hub at substantially the center thereof adapted to receive a wrench for unscrewing the barrel from the spoke flanges to be removed endwise at the larger end from the spoke flanges after the lock nuts have been loosened.

CORA ALDRIDGE,
*Executrix of the Estate of Lee Aldridge, Deceased.*